March 12, 1935.  J. THIRY  1,994,054
MACHINE FOR GOFFERING LENTICULATED FILMS
Filed Aug. 23, 1933
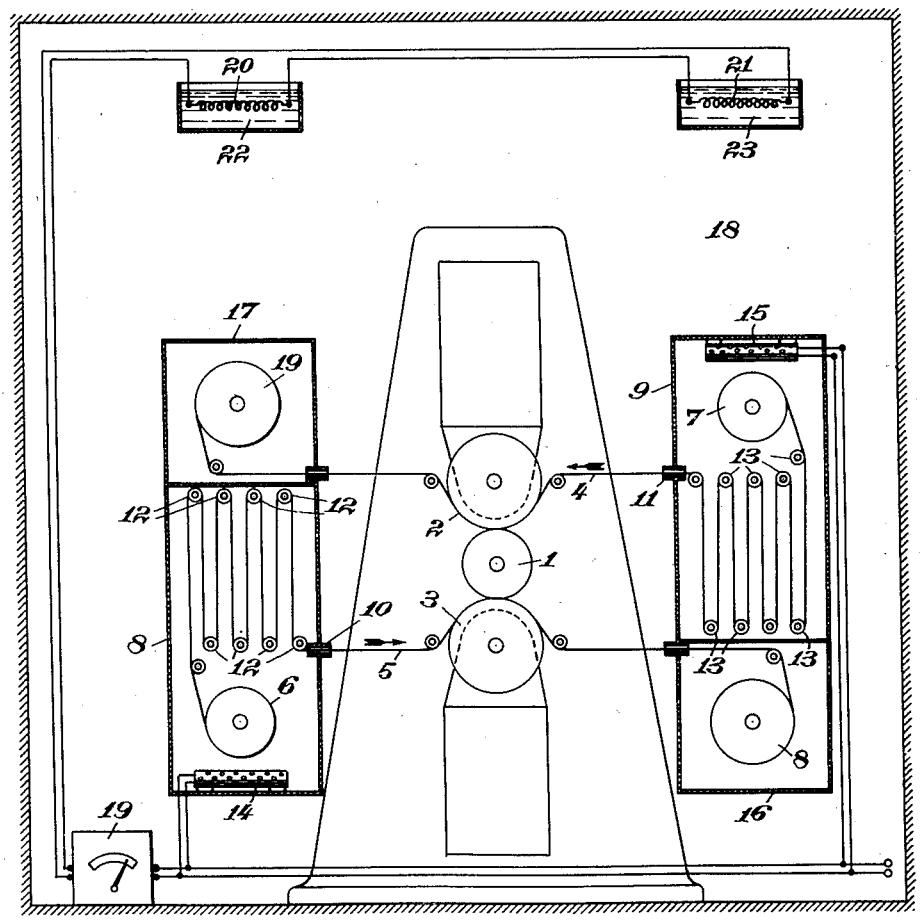

Patented Mar. 12, 1935

1,994,054

UNITED STATES PATENT OFFICE 1,994,054

MACHINE FOR GOFFERING LENTICULATED FILMS

Johannes Thiry, Berlin - Charlottenburg, Germany, assignor to Opticolor Aktiengesellschaft, Glarus, Switzerland, a Swiss corporation Application August 23, 1933, Serial No. 686,395
In Germany August 31, 1932

2 Claims. (Cl. 101—22)

This invention relates to a new machine for goffering lenticulated films.

The chief feature of the new machine is that there are means for preventing the film from getting spoilt by electrical discharges without its being scratched by mechanical means. Thus, by the new machine, the drawbacks of known machines are avoided. These drawbacks are the following:

When the films are drawn between the goffering rollers, electrical charges are generated by friction. Such charges must be drawn off as they give rise to small discharges—which, if not setting the film on fire, cause the emulsion to be exposed near the path of the discharges.

Brushes sliding upon the films were employed in order to lead off the charges. But the brushes cause often scratches upon the films, so that, when being projected, the images look rainy and the colors are given false at the spots of the scratches.

In order to avoid these drawbacks the new machine is so constructed that the rollers, upon which the films are rolling or sliding, are arranged within a space, containing humid air. By this means it is easy to cause the charges, generated by friction between the film and the rollers, to flow off. There is no danger of hurting the film, as no mechanical means for leading off the charges are used. In order to destroy the charges completely, it is advantageous to choose a rather high degree of humidity. It was stated by trials, that air with a relative degree of humidity which is at least 80 percent, is especially effective.

Besides it could be proved that such a high degree of humidity is on no account of any damage for the material of which the film is made. This holds the more as the films are generally included in vessels, which they leave only for a short time when being goffered, so that they are not in contact with the humid air for too long a time.

The invention may be performed by arranging not only the rollers, but the whole goffering machine, in a space with humid air. Those parts of the machine, which are not allowed to be in contact with humid air are then protected by air-tight vessels.

A further means for getting good results consists in passing the film through a drying-device before its being goffered, so that it gets rid of acetone $(CH_3.CO.CH_3)$. The drying-device may be arranged within the chamber with humid air or outside of it.

An example of the new machine is represented in the annexed drawing.

The goffering roller 1 is arranged in contact with the elastic counter-rollers 2 and 3 which are pressed against it. The films 4 and 5 are passed between the rollers in the directions indicated by the arrows. The films are drawn from the magazine rollers 6 and 7 which are arranged in the vessels 8 and 9. Before leaving these vessels at the openings 10 and 11, the films pass the rollers 12 and 13. Along this way they lose their contents of acetone and water, as the vessels 8 and 9 are heated by the heating-devices 14 and 15.

The goffered films are wound up in the vessels 16 and 17 on the rollers 18 and 19.

In order to procure a sufficient high degree of humidity within the room 18 containing the machine, a hygrometer 19 controls a relay, so that the coils 20 and 21 are heated and water is evaporated from the vessels 22 and 23, when the degree of humidity would become too low.

I claim:

1. A machine for goffering films comprising rollers, arranged within a vessel filled with humid air, and a drying-device, said films being arranged as to first pass said drying-device and then said rollers.

2. The method of goffering a film which comprises drying the film to a sufficient degree to substantially free it of acetone, and then passing it to a goffering device while maintaining it sufficiently moist to substantially prevent the generation of electricity by friction between the film and parts contacting therewith.

JOHANNES THIRY.